United States Patent
Savary-Sismondini et al.

(10) Patent No.: US 8,229,950 B2
(45) Date of Patent: Jul. 24, 2012

(54) PALEONEIGHBORHOOD HYDROCARBON SPATIAL SYSTEM

(75) Inventors: Berengere Savary-Sismondini, Stavanger (NO); Pierre Le Guern, Tananger (NO); Erik Monsen, Stavanger (NO); Hallgrim Ludvigsen, Stavanger (NO); Trond Benum, Trondheim (NO); Knut S. Boge, Stavanger (NO); Lars Sonneland, Tananger (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/123,952

(22) PCT Filed: Dec. 23, 2009

(86) PCT No.: PCT/IB2009/007884
§ 371 (c)(1),
(2), (4) Date: Apr. 13, 2011

(87) PCT Pub. No.: WO2010/076638
PCT Pub. Date: Jul. 8, 2010

(65) Prior Publication Data
US 2012/0023118 A1    Jan. 26, 2012

Related U.S. Application Data

(60) Provisional application No. 61/141,458, filed on Dec. 30, 2008.

(51) Int. Cl.
*G06F 17/30* (2006.01)
*G01V 7/00* (2006.01)
*G01V 1/40* (2006.01)

(52) U.S. Cl. .............................. 707/766; 702/2; 702/13

(58) Field of Classification Search .................. 707/766; 702/2, 13
See application file for complete search history.

(56) References Cited

U.S. PATENT DOCUMENTS

| 6,035,255 A | 3/2000 | Murphy et al. |
| RE38,229 E | 8/2003 | Marfurt et al. |
| 2002/0099504 A1 | 7/2002 | Cross et al. |
| 2005/0228623 A1 | 10/2005 | Leflon et al. |
| 2008/0140319 A1* | 6/2008 | Monsen et al. ................. 702/16 |
| 2010/0257004 A1* | 10/2010 | Perlmutter et al. ............... 705/7 |

* cited by examiner

*Primary Examiner* — Miranda Le

(57) ABSTRACT

A paleogeographic search system is provided for locating geoscience data relevant to a geographic search aperture. The paleogeographic search system comprises a geodatabase, an interface, a paleogeographic reconstruction engine, and a host processor. The paleogeographic engine is configured to transform the geographic search aperture according to tectonic plate movements to a transformed search aperture that the geographic search aperture occupied in a geological age of interest. The host processor is configured to apply a paleoaugmented geographic search aperture to a geodatabase for additional oil exploration data relevant to the geographic search aperture today. The paleoaugmented geographic search aperture is defined by augmenting the transformed search aperture to include relevant proximal locations for the selected geological age of interest to create an augmented transformed search area; and transforming the augmented transformed search aperture, according to tectonic plate movements, to the paleoaugmented geographic search aperture in present day world geography.

19 Claims, 9 Drawing Sheets

PALEONEIGHBORHOOD HYDROCARBON SPATIAL SYSTEM

This application claims the benefit of and is a non-provisional of U.S. Provisional Application Ser. No. 61/141,458 filed on Dec. 30, 2008, which is hereby expressly incorporated by reference in its entirety for all purposes.

FIELD

This application relates in general to information management for the geosciences, and in particular to the searching and retrieval of oil exploration data contained in geodatabases.

BACKGROUND

There is a pressing need to address the world's rising need for petroleum, and geologists continually search for methods to increase the availability of hydrocarbons, i.e. oil and gas, beneath the Earth's surface. In this search, various techniques may be used to generate data that is useful in oil and gas exploration, e.g. data that is useful for building and analyzing subsurface models of rock formations that could create petroleum reservoirs. These data are sometimes collectively referred to herein as "oil exploration data."

Examples of oil exploration data may include: 1) geochemical data from potential source rock to quantify the nature of organic-rich rocks which may contain precursors to hydrocarbons; 2) data from potential reservoirs to assess their porosity and their permeability; 3) data indicating the thickness and extent of potential seals to quantify their effectiveness; 4) stratigraphic and/or structural feature data to identify the right juxtaposition of reservoir and seal such that hydrocarbons remain in subsurface traps; 5) thermal history data of the potential source rock (maturation) in order to make predictions of the amount and timing of hydrocarbon generation and expulsion; and 6) migration data to determine how hydrocarbons move from source to reservoir at the site. This oil exploration data may be used to identify one or more geographic search areas that may be further explored by test drilling and other techniques.

Oil exploration data may be gathered directly from a particular site. For example, oil exploration data may be generated from aerial surveys, gravimeter readings, magnetometer readings, stratigraphic records such as sample logs, driller's logs, time logs, electrical logs, radioactivity logs and acoustic logs, sedimentology studies, geochemical studies, and maps including contour, isopatch, cross-sections, and three-dimensional computer images.

Modern petroleum geologists frequently use seismology, and in particular reflection seismology, to generate oil exploration data at a particular location in the form of a "seismic survey." A seismic survey involves creating shock waves that pass through subsurface rock layers and interpreting the waves that are reflected back to the surface. A shock wave is created by some means, e.g. a compressed-air gun (shooting pulses of air into the water for exploration over water), a thumper truck that slams heavy plates into the ground (for exploration over land) or explosives drilled into the ground or thrown overboard and detonated. The shock waves travel beneath the surface of the Earth and are reflected back by the various rock layers. The reflections travel at different speeds depending upon the type or density of rock layers through which they must pass. The reflections of the shock waves are detected by sensitive microphones or vibration detectors such as hydrophones for seismic surveys over water and seismometers for seismic surveys over land. The reflected signals are output onto a storage medium, for example, magnetic tape. Once the data is recorded, it can then be processed using specialist software which will result in processed seismic profiles being produced. Depending on the seismic survey technique used, the data may sometimes be used to create a three-dimensional image of the geology being surveyed. These seismic profiles and/or other data sets can then be interpreted to select possible hydrocarbon reserves. Once a prospective oil field is found, the location may be marked by GPS coordinates on land or by marker buoys on water. One aspect of investigating a site for a potential oil reservoir involves gathering as much exploration data as possible regarding the site and then analyzing that data. For example, in addition to seismic surveys conducted and recorded by or for the investigator, the investigator may perform one or more database searches to uncover oil exploration data relevant to the site that were generated by others.

The above methods help those in search of hydrocarbons to decide whether a particular tested location contains accessible hydrocarbon resources. However, countless locations remain untested. Searching for oil exploration data that was generated at a given site, or testing locations close to the site is a natural first step in acquiring further oil exploration data, and may provide the investigator with a useful set of information. However, depending on the particular potential reservoir, a local search of the present-day site may not be the optimal method of locating all relevant oil exploration data.

SUMMARY

The present invention provides a method of performing spatial queries in a data repository that honor the tectonic movements and disturbances of continental plates through geological time. Plate tectonic processes, and thus plate movement, have changed the earth geography through time, as have other geological events. Since the earth looked considerably different at the time of deposition/creation of an area of oil exploration interest, it is what was spatially close at this point in time, i.e. what was in the geologically relevant "paleoneighborhood," that defines an optimal search aperture. However, the points/areas defined by applying a spatial search aperture to the relevant paleoneighborhood are not necessarily close to each other in the present day.

The present invention may operate, for example, in the following manner. Using a set of present day coordinates and a geological age of interest, a query may be performed against a data repository that contains data or other artifacts that may be associated with world coordinates, e.g. a "geodatabase." The output of the query may be all artifacts (e.g., "oil exploration data") contained in the data repository, associated with their present day world locations, that at a specified geologic age were within a specified search aperture valid at that specific geologic age ("paleoneighborhood"). This output may be obtained by transforming the present day search area back in geological time according to plate tectonic motion, defining a spatial search aperture at the specified geological age and then transforming the spatial extent of the search aperture back to present day world geography. The transform need not be limited to models of plate motion describing plate friction and gravitation alone. Many geological events have contributed to the present day world geography, including, for example, earthquakes, volcanic activity, tidal forces from the moon, and asteroid impact. This transformed search aperture may then be used for performing a spatial search in the data repository to retrieve oil exploration data that correspond to these transformed locations. This oil exploration data may be combined with oil exploration data gathered from the present day site to give a more complete geological picture of the site. Naturally, such data need not be limited to oil exploration data, but may comprise data relating to any resources, including for example geological data relating to metal ores, radiological ores, precious gems, salts, fossils, and others.

The data from such searches may be compiled, selected, expanded, or contracted based upon user input or automated processes. These data may also be presented in a series of forms. Results may, for example, be presented in a list view, may be provided with a relevancy metric, may be summarized for quick review, and/or may be provided on a map for visual reference.

A paleogeographic search system for locating oil exploration data relevant to a geographic search aperture by identifying regions of the earth that were proximal neighbors in the past, but are not necessarily proximal neighbors today is disclosed. The paleogeographic search system includes a user interface, a paleogeographic reconstruction engine and a host processor. The user interface is adapted to receive inputted information into the paleogeographic search system. The inputted information includes:
geographic information defining the geographic search aperture, which comprises at least one of a spatial distance metric, a geographic coordinate, or a geometric shape; and a geological age of interest. The paleogeographic reconstruction engine is configured to transform the geographic search aperture, according to tectonic plate movements, to a transformed search aperture that the geographic search aperture occupied in the geological age of interest. The host processor is configured to acquire a search from a geodatabase for oil exploration data according to a paleoaugmented geographic search aperture. The paleoaugmented geographic search aperture is defined by augmenting the transformed search aperture to include relevant proximal locations for the selected geological age of interest to create an augmented transformed search area; and transforming the augmented transformed search aperture, according to tectonic plate movements, to the paleoaugmented geographic search aperture in present day world geography using the paleogeographic reconstruction engine.

A method for locating natural resource data relevant to a geographic search aperture by identifying regions of the earth that were proximal neighbors in the past, but are not necessarily proximal neighbors today is disclosed. In one step, access is provided with a user interface, to a paleogeographic search system having a geodatabase containing natural resource data. A geographic search aperture is received by the paleogeographic search system. The paleogeographic search system receives a geological age of interest. With a paleogeographic reconstruction engine, the geographic search aperture is transformed, according to tectonic plate movements, into a transformed search aperture that the geographic search aperture occupied in the geological age of interest. A geodatabase for natural resource data relevant to a paleoaugmented geographic search aperture is searched. The paleoaugmented geographic search aperture is defined by: augmenting the transformed search aperture to include relevant proximal locations for the selected geological age of interest to create an augmented transformed search area; and transforming the augmented transformed search aperture, according to tectonic plate movements, to the paleoaugmented geographic search aperture in present day world geography using the paleogeographic reconstruction engine.

A method of gathering seismic data relevant to a geographic search aperture by identifying regions of the earth that were proximal neighbors in the past, but are not necessarily proximal neighbors today is disclosed. In one step, a set of seismic survey results is stored in a geodatabase. The geographic search aperture and a geological age of interest are received. The geographic search aperture is transformed, according to tectonic plate movements and the geological age of interest, into a transformed search aperture. The geodatabase is queried for a subset of the set of seismic survey results relevant to a paleoaugmented geographic search aperture. The paleoaugmented geographic search aperture is defined by: augmenting the transformed search aperture to include relevant proximal locations for the selected geological age of interest to create an augmented transformed search area; and transforming the augmented transformed search aperture, according to tectonic plate movements, to the paleoaugmented geographic search aperture in present day world geography. The subset of seismic survey results is returned.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1A:
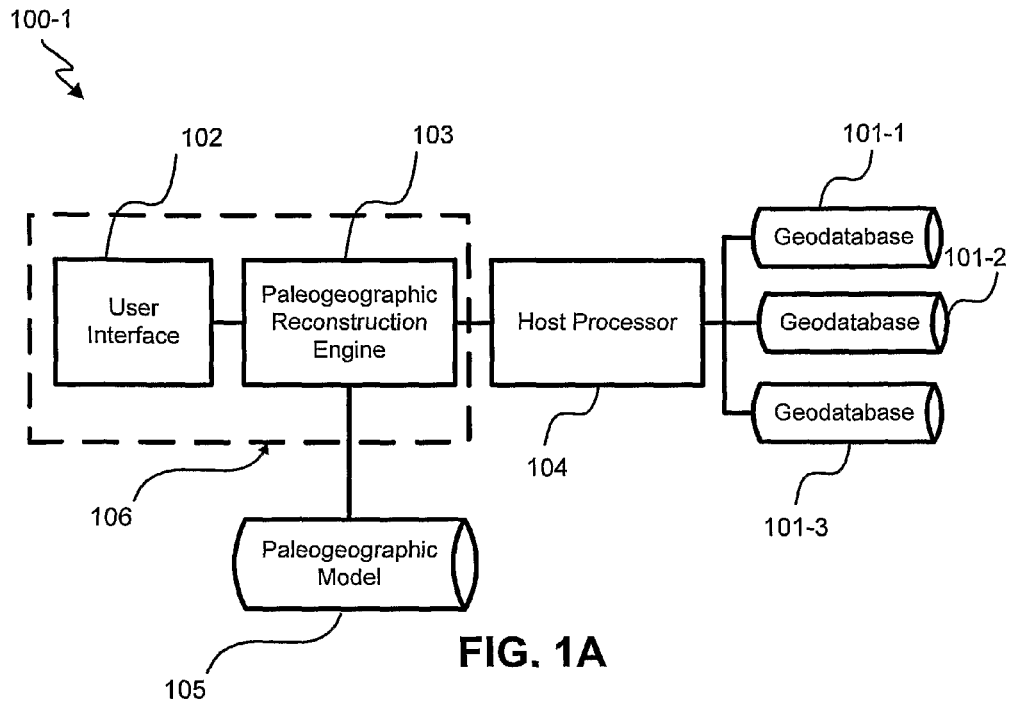
FIGS. 1A and 1B depict block diagrams of embodiments of a paleogeographic search system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth herein.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In one embodiment of the invention, information useful for oil exploration, e.g. oil exploration data, may be input into a spatial or geographic data repository that enables access to information that may be indexed to a specified geographic location to which the information is relevant. These databases may support a special type of database query known as a spatial query, which uses geometry data types such as points, circles, lines and polygons to define geographic areas, and considers the spatial relationship between these geometries. This information can be two or three dimensional. Databases designed to store, query and/or manipulate geographic information and spatial data are sometimes collectively referred to herein, including the appended claims, as "geodatabases." Within a geodatabase, spatial data is treated as any other data type. A geodatabase record can use a geometry data type to represent the location of an object or area in the physical world and other standard database types to store the object's associated attributes.

When performing a search of a geodatabase for hydrocarbon exploration data related to a particular geographic location of interest, a spatial query may be performed that returns all records that match a specified area nearby that location. The spatial query may be expressed as a single coordinate, or a geometric shape drawn on a map, e.g. a circle, a box, a triangle, a polygon, etc. For example, a spatial search aperture may comprise a circle drawn on a map at a certain geographic location and the geodatabase may be queried to return all hydrocarbon exploration data related to the area located within that circle. Such a spatial query is herein referred to as a "spatial search aperture," and may be used to search a geodatabase, in some cases together with traditional keyword filters that may serve as additional generic search constraints.

Seismic survey information, as well as information containing other natural resource data in unstructured documents such as reports, papers, memos, contracts, bulletins, presentations, and Internet web pages, may be placed in a geodatabase that may index the information to a particular geographic location and support spatial queries. The geographic location may be in the form of latitude and longitude coordinates, geological features (e.g. sedimentary basins), city and/or place names, street addresses, relative locations (e.g. 300 kilometer radius of a prospect), oil exploration and production entities such as wells, survey locations, fields, leases, prospects, etc. The geodatabase may then allow a user to conduct a search for all documents (or a subset thereof) that may be related to or associated with the geological location. The results may be displayed to the user, e.g. in a report or on a map provided on a terminal device. Examples of commercially available geodatabases include MetaCarta® geographic text search (GTS) system, Oracle Spatial®, Arc GIS™, Open Spirit™, and Google Earth™. Some geodatabases contain content specifically relevant to oil exploration, e.g. the MetaCarta® GTS system combined with the IHS™ Global Oil & Gas geographic Data Module, commercially available through Schlumberger Information Systems®.

In an embodiment of the invention, a present day search area may be transformed to the position that the area occupied during a specified geologic age, year or range of years. Geologic age is usually characterized according to an "absolute geologic time scale," which has been developed using isotopic dating based on the decay rates of certain radioactive materials. These decay rates are established and measured, and then used as "clocks" to calculate the ages of various rock structures in the earth. The geologic time scale breaks geologic time into various sections, e.g. "eons," which are subdivided into "eras," which are subdivided into "periods," which are subdivided into "epochs", which are subdivided into "ages". The time of deposition provides clues to potential oil reserves. The petroleum geologist is not as interested in the age of rocks in years as in the relative sequence of their deposition, and the time period to which they belong. Certain conditions existed on earth during each of the geologic periods, and knowing that a certain rock was deposited in a particular period may help the geologist interpret the oil production potential of rocks in the location of interest. For example, almost all of the oil and gas found so far in the world is contained within rocks from the Paleozoic Era (approximately 245-570 million years ago when invertebrates, fishes and amphibians were dominant) and the Mesozoic Era (approximately 66-245 million years ago when reptiles such as dinosaurs were dominant). Accordingly, petroleum geologists are mainly interested in studying rock structures formed during those eras.

The plate tectonic theory involves the principle that the Earth's lithosphere (upper layer) exists as separate and distinct tectonic plates which ride on the relatively fluid-like asthenosphere (lower layer). These plates move in relation to one another at one of three types of plate boundaries: convergent (collision) boundaries where the plates slide towards each other, divergent (spreading) boundaries where the plates slide away from each other, and transform boundaries where the plates grind past each other along transform faults. The movement of these plates has caused vast changes in the configuration of the earth's geography over millions of years through the formation and break-up of continents. The positions of the continents during each of the various geologic time scale periods have been mapped using evidence from paleomagnetism, linear magnetic anomalies, paleobiogeography, paleoclimatology, and prior geologic and tectonic events. See, for example, the earth's geographic evolution as described in the "Continental Drift, 7th edition," by C. R. Scotese, PALEOMAP Project, Arlington, Tex. (1997), herein incorporated by reference. Using this information, a computer-based system may be configured by application software to transform present day geographic locations to the global positions that they occupied at a specified geologic age (herein sometimes referred to as a "paleoposition"). This computer and/or associated software is referred to herein as a "paleogeographic reconstruction engine."

In one embodiment, the present invention provides a system that performs spatial querying of a geodatabase that takes into consideration the movement of the tectonic plates over time. These queries result in oil exploration data related to a present day geographic area that was once proximal to one another in the past, and therefore may be geologically relevant to the other area today. This proximal location of these areas during a specified geologic age or time frame is herein sometimes referred to as a "paleoneighborhood."

FIG. 1A illustrates a first representative embodiment 100-1 of a paleogeographic search system 106 and related components. In this first representative embodiment 100-1, a paleogeographic search system 106 is depicted where a user interface 102 provides input to a paleogeographic reconstruction engine 103. The paleogeographic reconstruction engine 103 utilizes a paleogeographic model 105 in order to transform an input search aperture into a paleoneighborhood, and to correlate that paleoneighborhood back into its present day location. It will be understood that the paleogeographic reconstruction engine 103 may utilize the paleogeographic model 105 as one or a series of separate paleogeographic models, and may do so over an Internet connection, network, wireless local area network ("WLAN") or other connection. Next, the paleogeographic reconstruction engine 103 accesses one or several geodatabases 101 via a host processor 104. These one or several geodatabases 101 may contain a variety of geological testing data, including oil exploration data, or data on other natural resources.

The one or several geodatabases 101 may be contained in a conventional storage device that includes solid state memory, such as RAM, ROM, PROM and the like; magnetic memory, such as disc drives, tape storage and the like; and/or optical memory, such as DVD. The one or several geodatabases 101 may, for example, be stored as a series of tables, lists, searchable files, web pages, indexed data elements, or other forms accessible to the paleogeographic search system 106 or host processor 104. In the one or several geodatabases 101, data may be indexed by geographic location, region, distance, type of data or test performed, relevancy, or other metrics. The one or several geodatabases 101 may further be accessible directly via the user interface 102 or the host processor 104. In some embodiments, the one or several geodatabases 101 may be linked to each other either singly or by any combination of wired or wireless means, may utilize an associated processor which is not the host processor 104 in order to generate results, or may have tiered levels of permission based upon user identity or subscription package.

The user interface 102 may include conventional terminal or computing devices that are configured to allow a user to enter information, e.g. geographic coordinates, keywords, dates, queries, etc., into the system, as well as receive and display information from the system, e.g. search results, maps, etc. The user interface 102 need not necessarily be tied to a specific piece of hardware, however, and may be implemented in software, for example as a browser application or extension, as an application programming interface ("API"), or as executable code embodied on a computer-readable medium. The one or several geodatabases 101 may also be directly accessible via the user interface 102.

The paleogeographic reconstruction engine 103 may be implemented on a variety of platforms, including any microprocessor based computer configured to perform the transformation of the coordinates of a present day geographic area to the coordinates of the geographic global position that it occupied during a specific geologic age ("paleoposition"), and the transformation of a paleoposition back into a present day location. Alternatively, the paleogeographic reconstruction engine 103 may be application software that programs the host processor 104 to perform the transformations. The paleogeographic reconstruction engine 103 may directly access the paleogeographic model 105, may internally store the paleogeographic model 105, or may access the paleogeographic model 105 via an intermediary such as the Internet or a third-party application. The paleogeographic reconstruction engine 103 may further access one or several of the paleogeographic model 105, each paleogeographic model 105 accessed may contain the same or different data sets from each other.

The host processor 104 may be any microprocessor device capable of processing information according to the invention and may include client software to view and edit oil exploration data stored within the one or several geodatabases 101. The host processor 104 may be implemented as a distributed computing system, a single processor or many parallel sets of processors, or may be included on the client device itself.

The paleogeographic model 105 may be external or internal to the paleogeographic reconstruction engine 103 and/or the paleogeographic search system 106. The paleogeographic model 105 may be stored as a set of static data elements or dynamic application software, and may be accessed in sequence or in tandem with other paleogeographic model 105 elements by the paleogeographic reconstruction engine 103, the paleogeographic search system 106, or the host processor 104. The paleogeographic model 105 may contain one or many sets of transformations, movements, coordinates, data points, or other indicia of plate tectonic motion. These indicia may be indexed by location, by time period, by plate boundary, by other means, or may alternatively not be indexed at all.

Figure 1B:
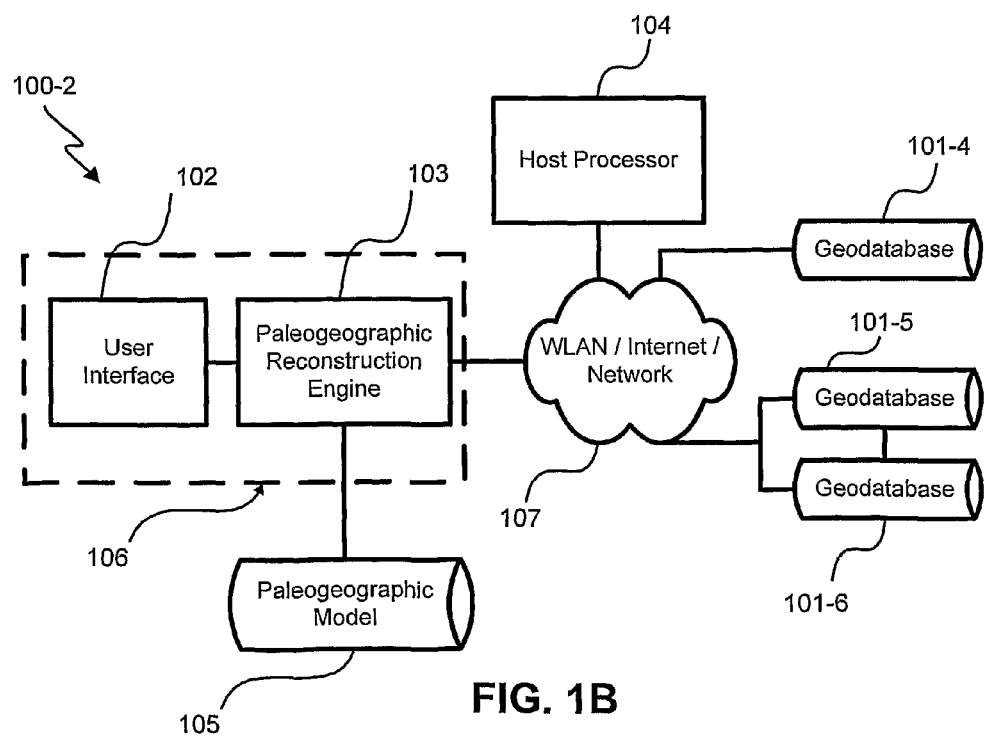

With reference to FIG. 1B, a second representative embodiment 100-2 of a paleogeographic search system 106 and related components is shown. In the second representative embodiment 100-2, a paleogeographic search system 106 is depicted, wherein a user interface 102 provides input to a paleogeographic reconstruction engine 103. The paleogeographic reconstruction engine 103 utilizes a paleogeographic model 105 in order to transform an input search aperture into a paleoneighborhood, and to transform that paleoneighborhood back into its present day location. It will be understood that the paleogeographic reconstruction engine 103 may utilize the paleogeographic model 105 as one or a series of separate paleogeographic models, and may do so over an Internet connection, network or WLAN if desired. Next, the paleogeographic reconstruction engine 103 accesses one or several geodatabases 101-4-101-6 via a host processor 104.

The one or several geodatabases 101-4-101-6 and the host processor 104 may be accessed across an Internet connection, network, or WLAN 107 if desired.

The Internet connection, network, or WLAN 107 may be accessed via a wired or wireless connection, and may comprise one or many computers or associated network devices, such as routers, switches, hubs, servers, and application software. The Internet connection, network, or WLAN 107 may further act as an intermediary between any or all elements of the first embodiment 100-1 or the second embodiment 100-2. Further, the Internet connection, network, or WLAN 107 may be in one-way communication or two-way communication with one or all of the paleogeographic search system 106, the host processor 104, the user interface 102, the paleogeographic reconstruction engine 103, the paleogeographic model 105, or the one or several geodatabases 101. The above-referenced elements may be configured to initiate or receive such communication from or to the Internet connection, network, or WLAN 107 of the invention.

Figure 2:
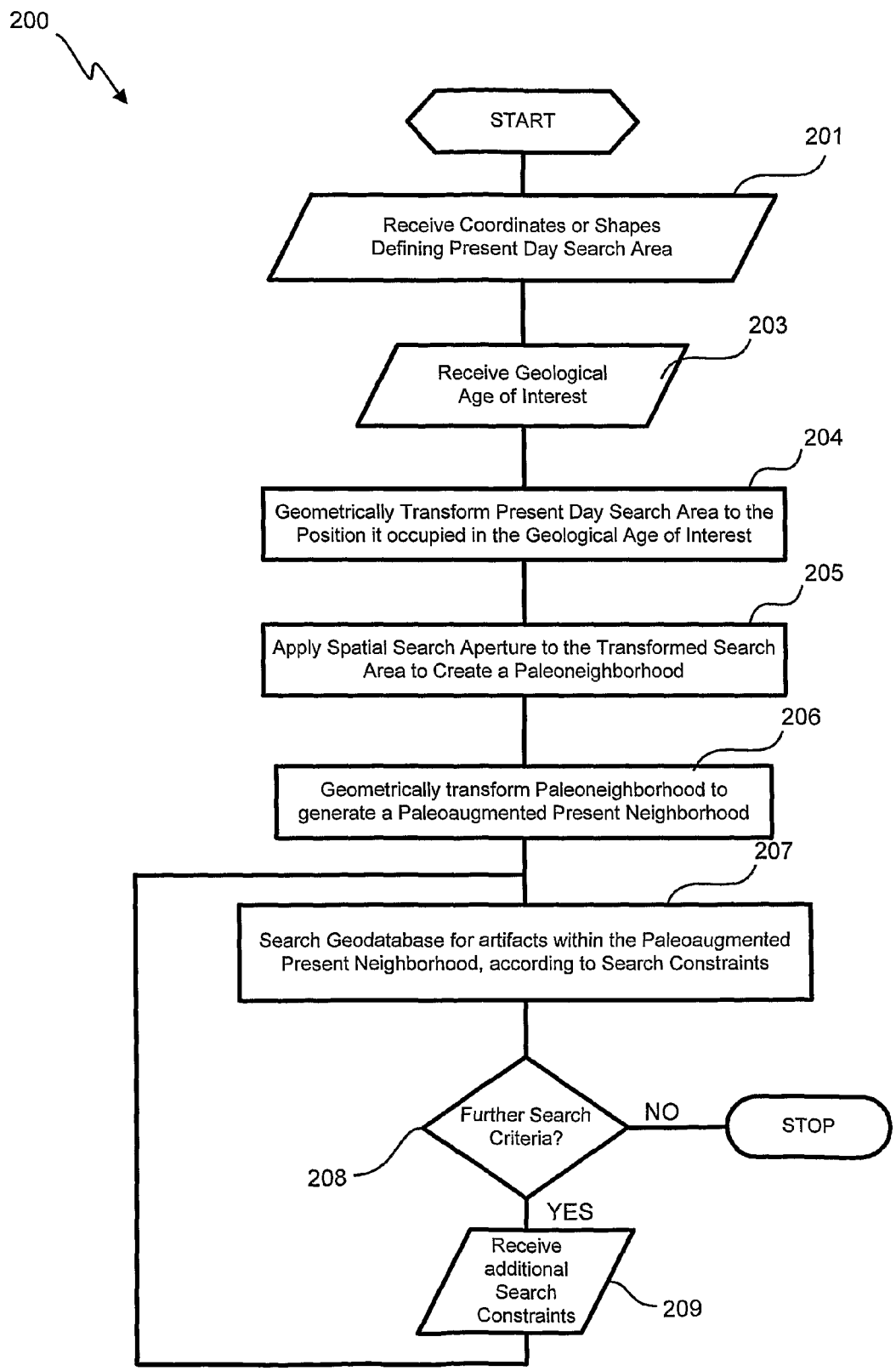
FIG. 2 illustrates a flowchart of an embodiment of a process for operating the paleogeographic search system.

Referring next to FIG. 2, a flowchart of an embodiment of a process 200 for operating the paleogeographic search system is provided. In the flow diagram 200, the process begins with the receipt of data defining the present day search area or first search aperture at block 201. This search area may be, for example, an area encompassing a known source of oil and gas or other natural resources, e.g. an oil field, a producing oil well, an oil lease, etc., or it may be a prospective drilling site that has been identified by the analysis of oil exploration data, e.g. seismic surveys, geology reports, geodatabase searches, etc. This search area may be received manually via the user interface 102 or may be acquire automatically by the user interface 102 or by other means.

The first spatial search aperture is received by the paleogeographic search system 106. The first spatial search aperture may have a defined geometric shape such as a circle, box, triangle, etc. that encompasses an area of interest within the present day world geography. In one embodiment, the paleogeographic search system 106 or host processor 104 may use the first spatial search aperture to query the one or several geodatabases 101 to return all records that are relevant to the given search area.

Next, at block 203, a geological age of interest may be received at the paleogeographic search system 106. For example, if it is known that certain layers of rock in the search location were formed in the Jurassic period (144-208 million years ago), then that geologic age may be entered into the system. Generally, the geological age of interest is far back enough to have significant tectonic movement (e.g., greater than five or ten thousand years). Inputs to the paleogeographic search system 106 may be provided in any order, or not at all in certain instances. Such geological ages of interest may be defined by a specific year or set of years, or by a name for a given geological period, epoch or age. Such geological ages of interest may also be defined by nicknames or shorthand notation of specific dates. These geological ages of interest may also be automatically acquired or received by reference to the age pertaining to a particular hydrocarbon reservoir, or by reference to the age of a given region or a sample for which data is stored in one or several geodatabases 101. For example, a particular stratigraphic element in a given core sample may be tied to a specific geological age. One or many geological ages of interest may be acquired or received in order to allow for multiple searches to be performed.

The paleogeographic search system 106 may be configured to accept as a search criteria a piece of known testing data. For example, the paleogeographic search system 106 may accept a multi-layered core sample as an input parameter. If a user were to select a specific layer in the given core sample, the paleogeographic search system 106 could use the age of the specific layer as the geological age of interest. Any number of parameters could be used from existing data to in order to enhance the search process.

In block 204, the paleogeographic search system 106 then proceeds to utilize the paleogeographic model 105 to transform the present day search area or first spatial search aperture to the area it occupied in the geological age of interest, defining a transformed first spatial search aperture. Where no geological age of interest is specified, all geologic ages could be used for the transformed first spatial search aperture while allowing later narrowing of the geological age of interest. The transformation may be achieved in many ways. Merely by way of example, the paleogeographic search system 106 may take a listed series of coordinates tied to the first spatial search aperture's geologic position, and acquire the appropriate location of the transformed first spatial search aperture by referencing the paleogeographic model 105. Thus, in such an embodiment the paleogeographic model 105 may function as a database from which elements and tables may be queried, manipulated, and created by the host processor 104 or the paleogeographic search system 106. Alternatively, the paleogeographic model 105 may contain a series of equations or probability metrics that are dynamically applied to the locations of the present-day spatial search aperture in order to transform the present-day spatial search aperture to its paleoposition. In these embodiments, the paleogeographic reconstruction engine 103 may utilize the host processor 104 in order to apply the transformations to the locations of the present-day spatial search aperture or may apply the transformations independently of the host processor 104 to find the transformed first spatial search aperture.

The paleogeographic search system 106 proceeds to define a "paleoneighborhood" by applying a second spatial search aperture to the transformed first spatial search aperture in block 205. The second spatial search aperture could have an irregular shape defined by the transformation or can be expanded or contracted to conform to a geometric shape such as a circle, box, triangle, etc. to potentially include more search results. Such paleoneighborhoods may comprise areas that are exclusively land, or areas that are exclusively water, or any combination or land and water regions according to preference specified by the end user. Paleoneighborhoods may also be further defined by other criteria. For example, a paleoneighborhood could comprise a specific subset of proximal neighbors to the paleoposition, wherein the subset of proximal neighbors were affected by the same geological events that deposited hydrocarbons in the paleoposition.

The paleogeographic search system 106 then proceeds in block 206 to transform the paleoneighborhood or second spatial search aperture to present world geography, thereby creating a transformed paleoneighborhood or paleoaugmented present day search area or third spatial search aperture. This process may occur by similar methods and elements as described above for block 204, but may also operate with different methods and elements to those of block 204, depending on the preference of an end user.

At block 207, the paleogeographic search system 106 may search the one or several geodatabases 101 for artifacts within the third spatial search aperture according to any received search constraints. The third spatial search aperture may be used to query the one or several geodatabases 101 to return relevant records. The oil exploration data returned from the search using the third spatial search aperture generally includes the oil exploration data returned using the first spatial search aperture, thus providing a more complete analysis of the present day search area entered into the paleogeographic search system 106 at block 201. In another embodiment, the second spatial search aperture around the paleoposition can be manually manipulated and the oil exploration data returned from the search using the corresponding third spatial search aperture may be used in the identification of a new present day search location having a modified shape.

The paleogeographic search system 106 may then provide its results and decide whether further search criteria is desired in order to alter a given search, at block 208. This determination may be made automatically by the system, or may be received to the system with user input via the user interface 104 or via other inputs to the system. Such determinations may be based upon the number of results acquired from the one or several geodatabases 101, the relevancy of results and/or other metrics.

If further search is desired, the system may receive additional search constraints automatically, or via the user interface 102 at block 209, and then re-run the search at block 207. Alternatively, if no further search is desired, the paleogeographic search system 106 may provide its results and then terminate the process. Such processes as depicted by flow diagram 200 may optionally be run synchronously, sequentially, or in parallel as preferred.

The results of the search according to the invention may be all or a subset of the records in the one or several geodatabases 101 that were associated with the geographic area that the third search aperture occupied in the given geological age, and that match any other additional constraints introduced into the search parameters. These results may provide additional information beyond what a search that was limited to present day conditions or the first spatial search aperture only would find. Such results may be restricted or limited, and may require payment based upon a user's permission level. Also, such results may be similarly altered depending upon the one or several geodatabases 101 searched by the host processor 104.

Figure 3A:
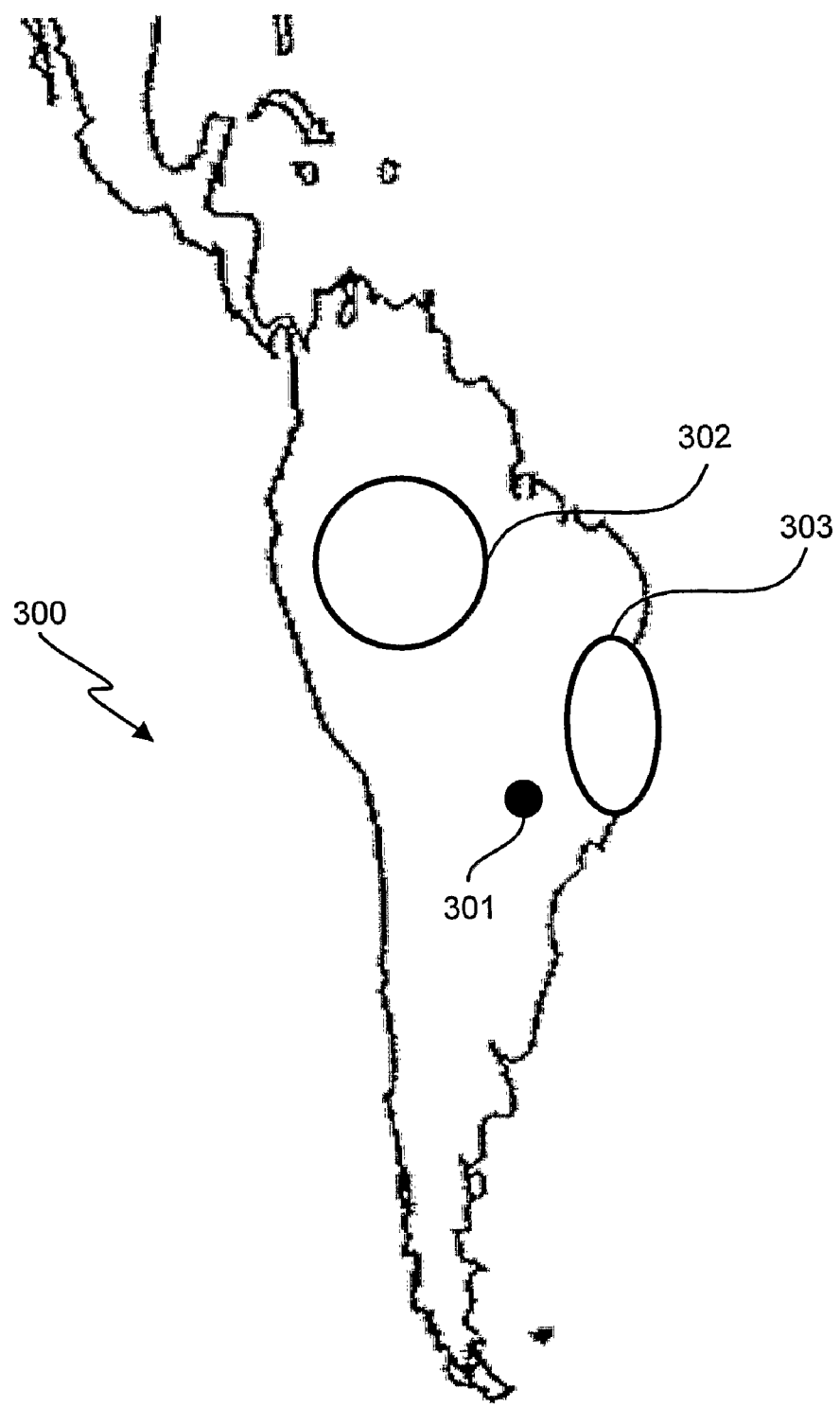
FIGS. 3A, 3B, 3C, and 3D depict diagrams of embodiments of a map with search areas.

Referring next to FIG. 3A, an embodiment of a diagram showing a map 300 with search areas is depicted. In the example set of search areas, a user may, for example, define a search area consisting of a single coordinate 301, a circle 302, or an ellipse 303. By way of example, the circle 302 could be defined by a single coordinate and a radius, or two points. The ellipse 303 could similarly be defined, for example, by two foci, by two circumferential points and a radius, or by a single point and two radii. Search areas may be defined in any combination of noncontiguous or contiguous search areas, and may alternatively be made of more complicated geometric shapes. By way of example only: squares, circles, ellipse, pentagons, "star" shapes, triangles, polygons of any form, irregular shapes, or any combination of lines, points, and/or equations defining an area may be used to define search areas.

Figure 3B:
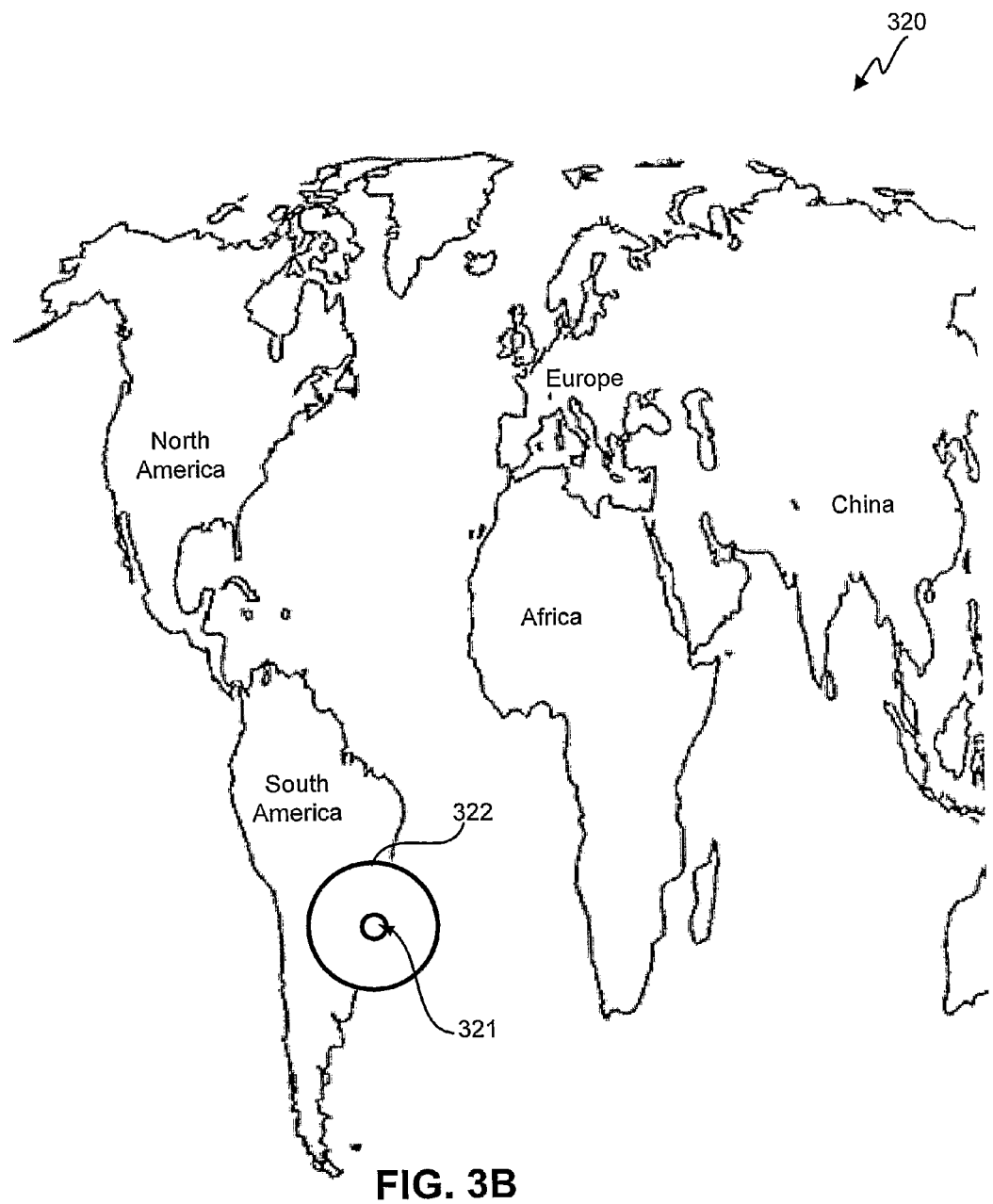
Figure 3C:
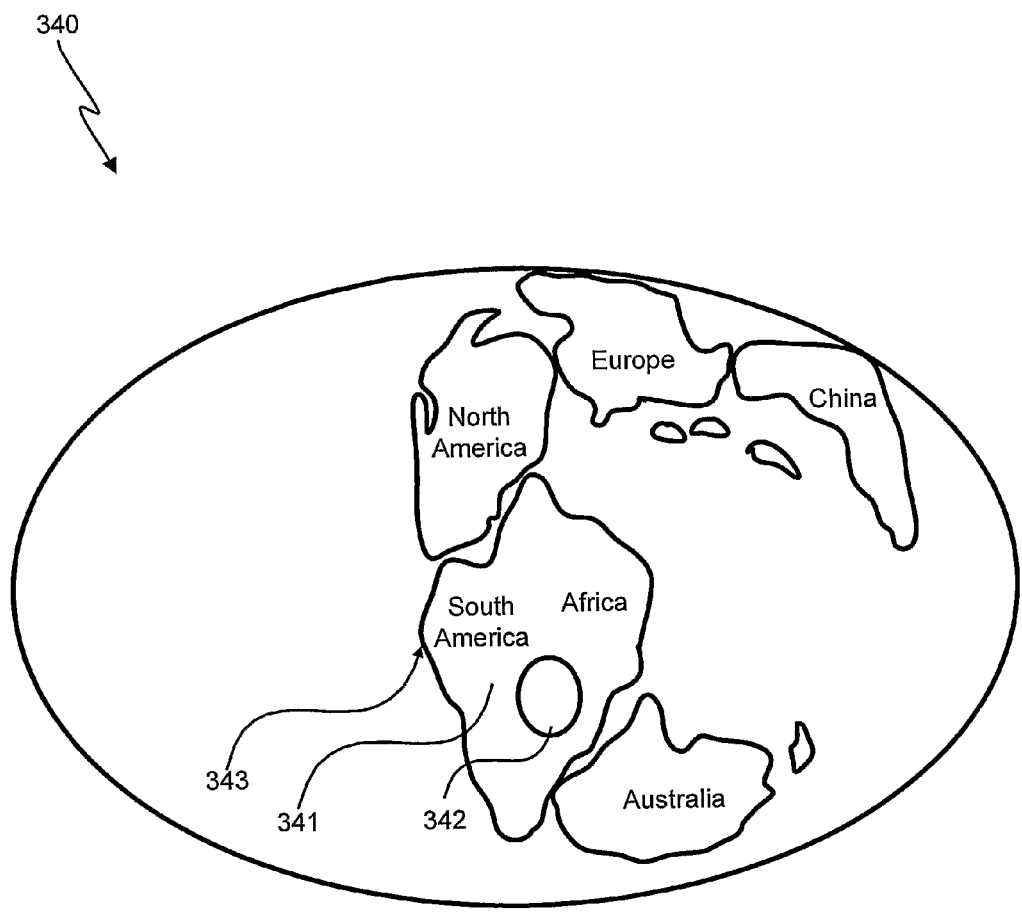
Figure 3D:
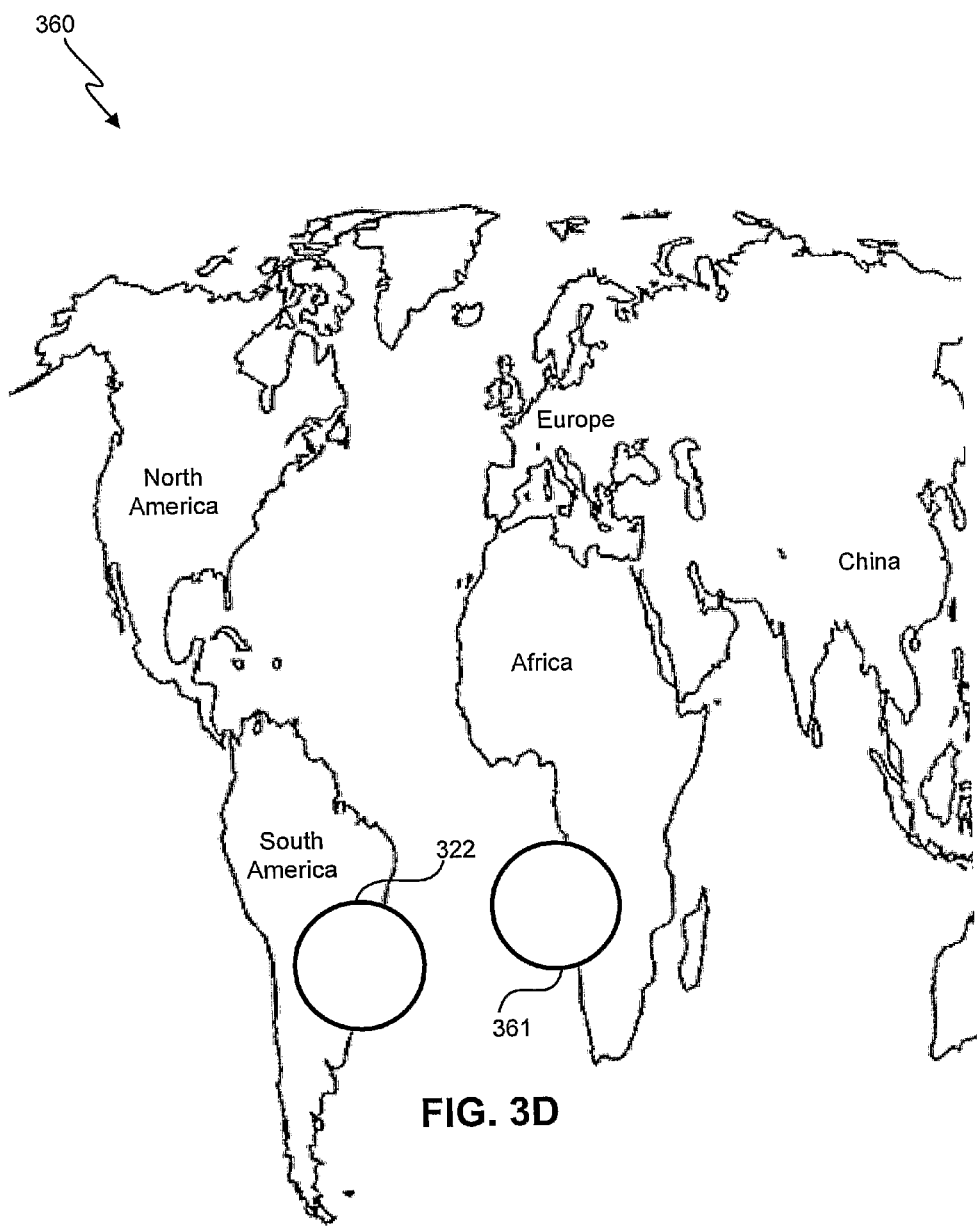

An embodiment of the present invention may be more fully understood by referring to the following example in conjunction with FIGS. 3B-D, which example is not intended to limit the invention but merely to illustrate it. FIG. 3B includes a first present-day depiction 320 of the world's continents. A user/company may be exploring an area off the east coast of South America 321, for example. As a first step in gathering oil exploration data that is relevant to the new area, a geodatabase search may be performed for oil exploration data that is spatially close to the new location by querying the one or several geodatabases 101 using a first spatial search aperture 322. Assume it has been determined that a potential oil reservoir may be contained within rock deposited in the Jurassic age.

FIG. 3C includes a depiction 340 that shows the paleoposition of South America 341 in the Jurassic period when it was connected to the Africa to form a supercontinent 343. The depiction 340 need not be displayed to the user for the paleogeographic search system 106 to function, but may be displayed to the user via the user interface 104 if the user prefers. FIG. 3C depicts the application of a second spatial search aperture or paleoneighborhood 342 to the paleoposition of the first spatial search aperture 322 of 321 off the east coast of South America. The paleoneighborhood or second spatial search aperture 342 is defined to at least encompass the transformed first spatial search aperture. In accordance with the invention, the paleoneighborhood 342 may be geographically transformed back to its present day global configuration, as shown in FIG. 3D.

In FIG. 3D, a second present-day depiction 360 is presented. In the second present-day depiction 360, the transformation of the paleoneighborhood 342 to its present day position results in a third spatial search aperture. The third spatial search aperture contains the first spatial search aperture 322 by definition, but is enlarged by spatial search aperture 361 off the west coast of Africa. The addition of spatial search aperture 361 is a consequence of splitting the second spatial search aperture 342 according to the South-Atlantic opening, as captured by the paleogeographic transform engine 103. The additional spatial search aperture 361 may then be used to perform a spatial query of the one or several geodatabases 101 to return relevant oil exploration data. The results of both searches, relating to spatial search apertures 322 and 361, may provide more complete oil exploration data regarding the potential reservoir than merely searching locally around the site, as defined by the first spatial search aperture 322.

In addition, the results of geodatabase searches using the additional spatial search aperture 361 may be used to locate a new area of investigation in west Africa that may not have been previously considered. The searches may be performed with additional generic search constraints to further narrow the search, if desired. The searches may also be run sequentially, as described, or synchronously. Additionally, the searches need not display the specific graphic embodiments displayed in FIGS. 3A-D. In fact, graphic embodiments are not necessarily required for the search system to function. However, graphic depictions of the search process may assist users in implementing their searches in various embodiments.

Figure 4A:
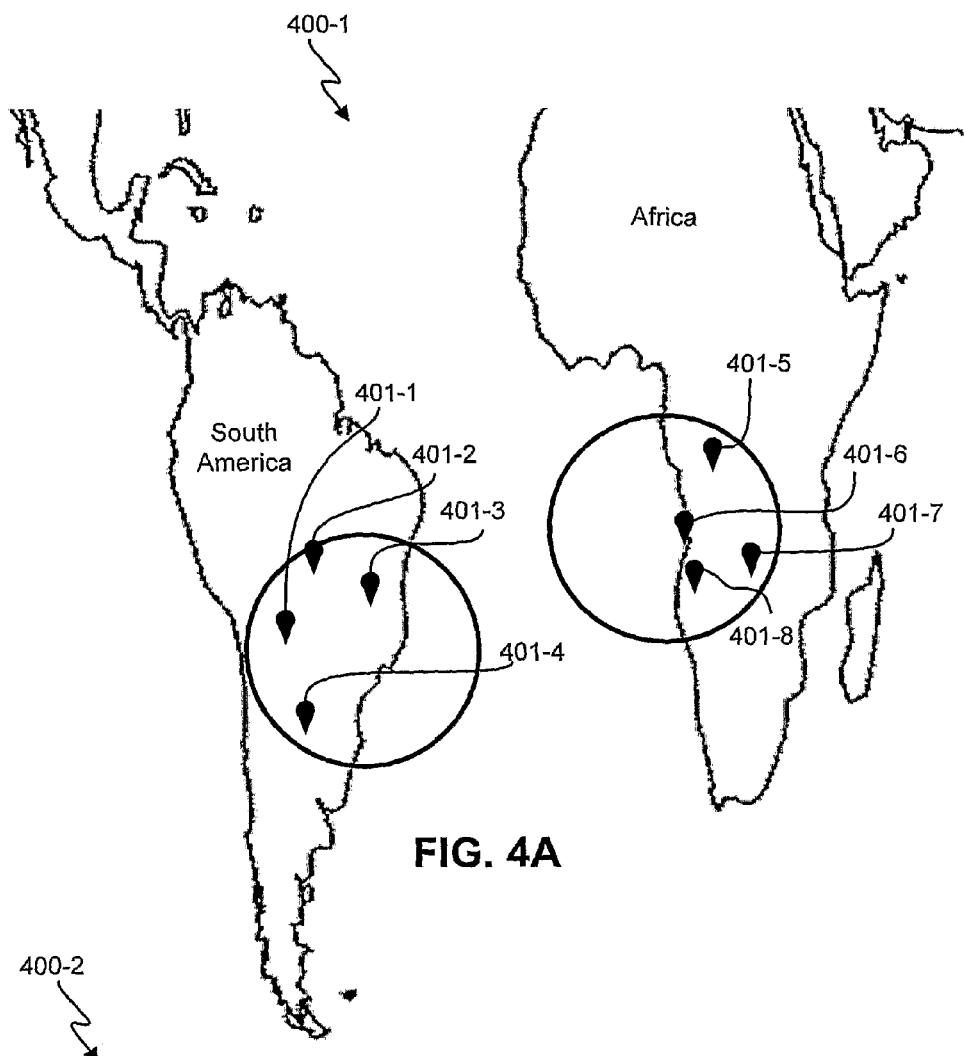
FIGS. 4A and 4B depict block diagrams of embodiments of search reports.
Figure 4B:
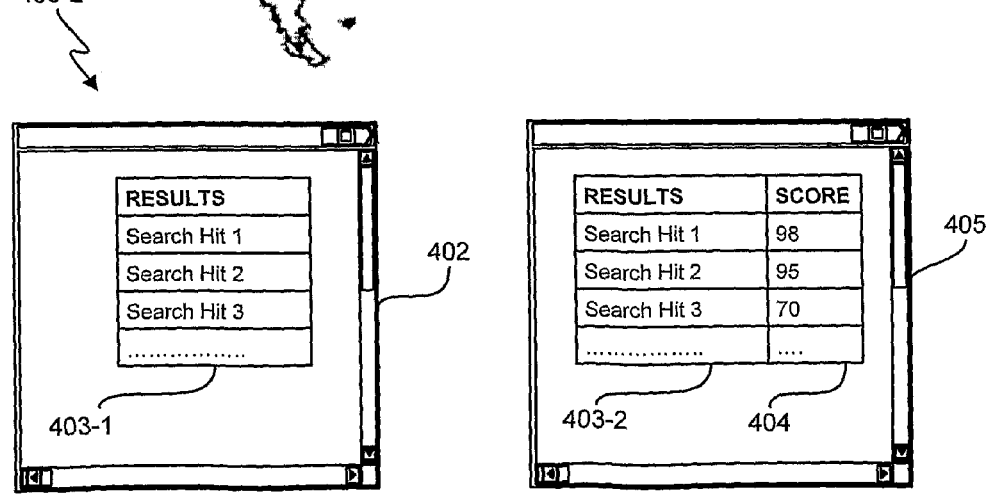

With reference to FIGS. 4A-B, embodiments of search reports are shown. In FIG. 4A, a series of visual results 401, provided on a first depiction 400-1, visually indicate available records in the spatial search aperture. Visual results 401 may comprise relevant results of searches of the one or several geodatabases 101. The visual results 401 may be linked to actual results in the one or several geodatabases 101, or sets of results, and may include summaries of the results or the full data of the results themselves. Further, the visual results 401 may be provided to the user via video terminal display, e-mail, print, fax, or by forms of electronic communication. The visual results 401 may be presented to the user, or a set of individuals or companies, and may be limited in content based upon the permissions and/or subscription plans of the user operating the paleogeographic search system 106.

FIG. 4B provides a second depiction 400-2. In this second depiction 400-2, a series of informational results 403 are provided for review in a list form 402 on an electronic device. The informational results 403 need not be viewed on a computer, but can be transmitted to any electronic device, or can be presented in printed form. The visual results 401 and/or informational results 403 may also be presented with relevancy metrics 404. The relevancy metrics 404 could be presented as percentage indicators, raw scores, letter grades, other sets of words or numbers, or any combination thereof. The informational results 403 could be variously associated with a single relevancy metric, or several. Both the visual results 401 and the informational results 403 may comprise combinations of both graphics and text, or may exclusively consist of either graphics or text alone. In one embodiment, the user may implement a specific set of relevancy metrics. For example, a user could give highest priority to a given type of sample data, e.g., aerial surveys. Additionally, a user could set relevancy metrics based on other criteria including whether the test data measures a specific variable or indicates a potentially valuable lead.

The results of the search may be further enhanced based upon input search criteria, for example, if a layer of a core sample were entered as a search criteria, the paleogeographic search system 106 could return records in the one or several geodatabases 101 that pertained specifically to other core samples within the search aperture. Such records could further be matched if they contained the same layer used as a search criteria. Relevancy metrics could then be tied to the likelihood of matches between specific layers of core samples.

Figure 5:
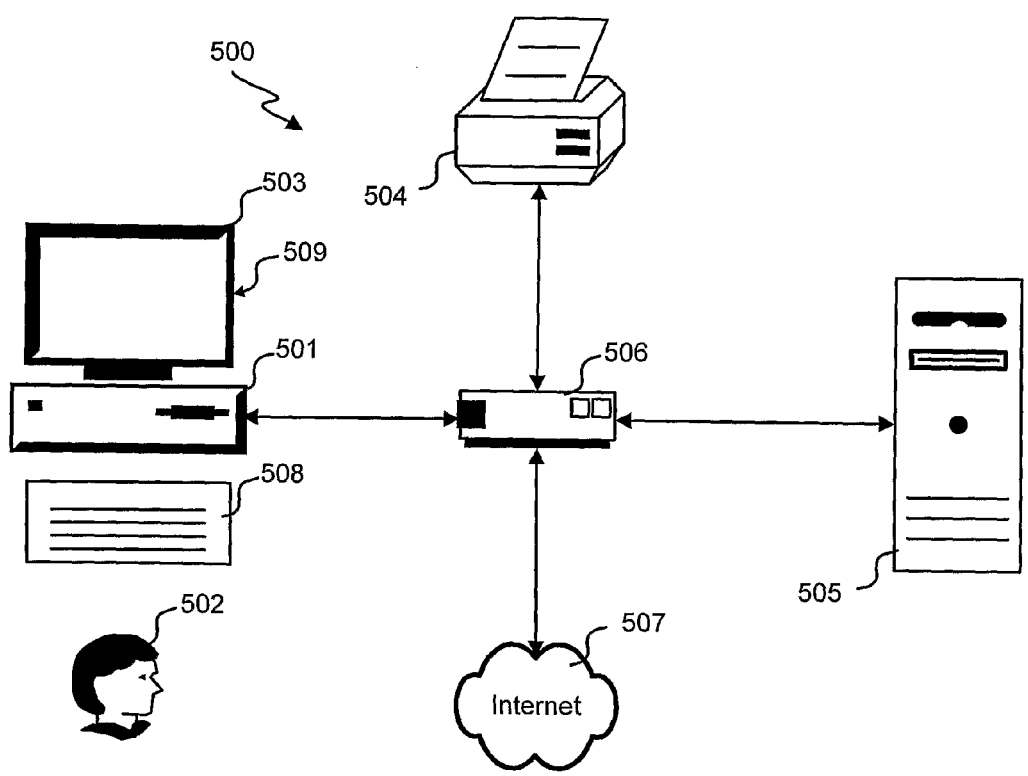
FIG. 5 depicts a block diagram of an embodiment of a computer system.

Referring next to FIG. 5, an exemplary environment with which embodiments of the invention may be implemented is shown with a first computer system 500 that can be used by a system user 502 to acquire paleogeographic correlations. The first computer system 500 can include a computer 501, a keyboard 508, a network router 506, a printer 504, and a display device 503. The display device 503, the computer 501 and the keyboard 508 are part of a second computer system 509, which can be a laptop computer, desktop computer, handheld computer, mainframe computer, etc. The display device 503 can be a CRT monitor, flat screen, LCD display, etc.

The system user 502 can input commands into the computer 501 using various input devices, such as a mouse, the keyboard 508, track ball, touch screen, etc. If the first computer system 500 comprises a mainframe, the system user 502 can access the computer 501 using, for example, a terminal or terminal interface. Additionally, the second computer system 509 may be connected to the printer 504 and/or a server 505 using the network router 506, which may connect to an Internet and/or wireless area network (WAN) 507.

The server 505 may, for example, be used to store additional software programs and data. In one embodiment, software implementing the systems and methods described herein can be stored on a storage medium in the server 505. Thus, the software can be run from the storage medium in the server 505. In another embodiment, software implementing the systems and methods described herein can be stored on a storage medium in the computer 501. Thus, the software can be run from the storage medium in the second computer system 509. Therefore, in this embodiment, the software can be used whether or not the computer 501 is connected to the network router 506. The printer 504 may be connected directly to the computer 501, in which case, the second computer system 509 can print whether or not it is connected to the network router 506.

Figure 6:
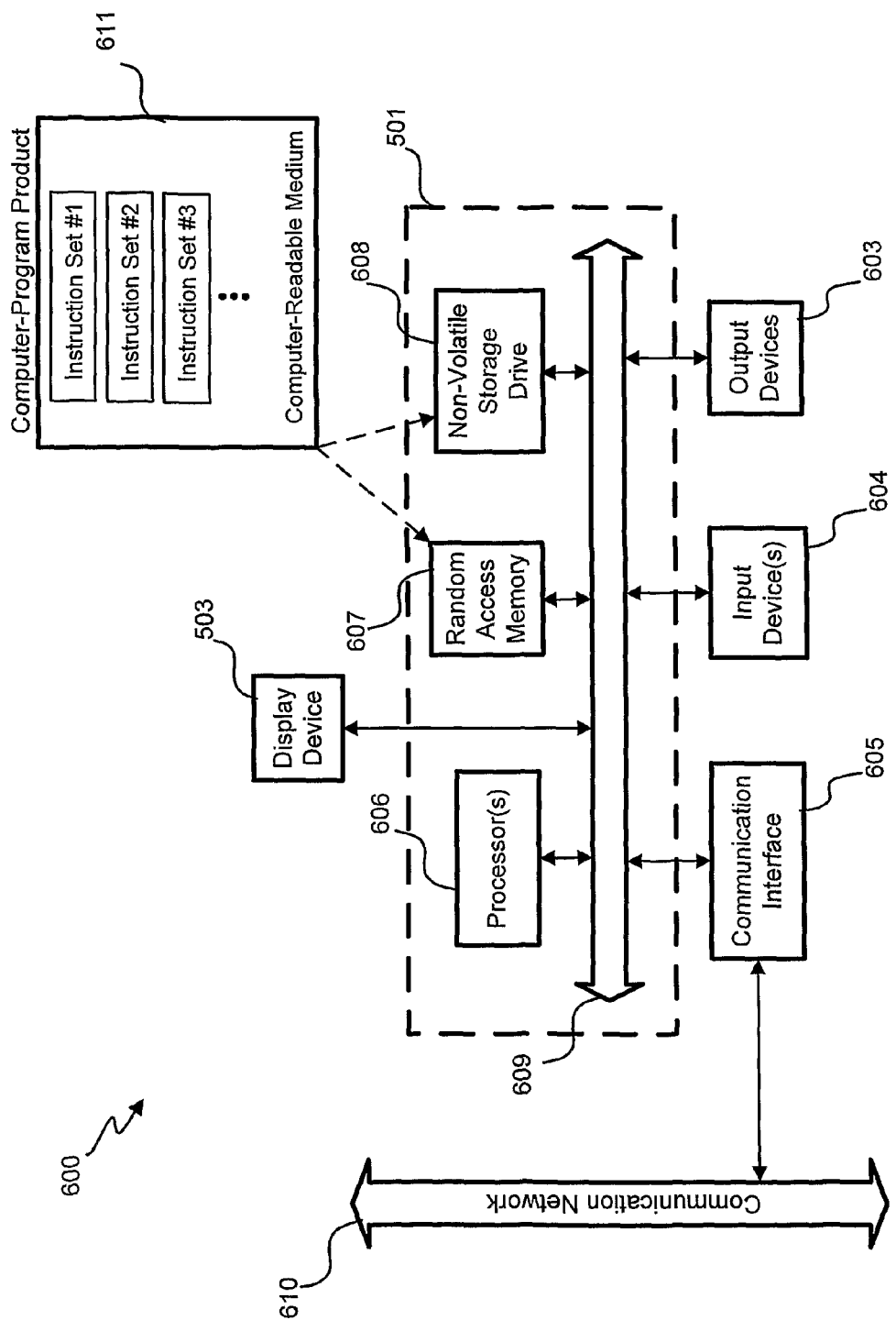
FIG. 6 depicts a block diagram of an embodiment of a special-purpose computer system.

With reference to FIG. 6, an embodiment of a special-purpose computer system 600 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose second computer system 509, it is transformed into the special-purpose computer system 600 for paleogeographic searches.

The special-purpose computer system 600 comprises a computer 501, a display device 503 coupled to the computer 501, one or more user output devices 603 (optional) coupled to the computer 501, one or more user input devices 604 (e.g., keyboard, mouse, track ball, touch screen) coupled to the computer 501, an optional communications interface 605 coupled to computer 501 and configured to communicate with a communication network 610, a computer-program product 611 stored in a tangible computer-readable memory in computer 501. The computer-program product 611 directs the special-purpose computer system 600 to perform the above-described methods. The computer 501 may include one or more processors 606 that communicate with a number of peripheral devices via a bus subsystem 609. These peripheral devices may include the one or more user output devices 603, the one or more user input devices 604, the communications interface 605, and a storage subsystem, such as random access memory (RAM) 607 and/or a non-volatile storage drive 608 (e.g., disk drive, optical drive, solid state drive), which are forms of tangible computer-readable memory.

The Computer-program product 611 may be stored in the non-volatile storage drive 608 or another computer-readable medium accessible to the computer 501 and loaded into the RAM 607. Each of the one or more processors 606 may comprise a microprocessor, such as a microprocessor from Intel® or Advanced Micro Devices, Inc.®, or the like. To support the computer-program product 611, the computer 501 runs an operating system that handles the communications of the computer-program product 611 with the above-noted components, as well as the communications between the above-noted components in support of the computer-program product 611. Exemplary operating systems include Windows® or the like from Microsoft Corporation, Solaris® from Sun Microsystems, LINUX, UNIX, and the like.

The one or more user input devices 604 include all possible types of devices and mechanisms for inputting information to the computer 501. These may include a keyboard, a keypad, a mouse, a seamier, a digital drawing pad, a touch screen incorporated into the display, audio input devices such as voice recognition systems, microphones, and other types of input devices. In various embodiments, the one or more user input devices 604 are typically embodied as a computer mouse, a trackball, a track pad, a joystick, wireless remote, a drawing tablet, a voice command system. The one or more user input devices 604 typically allow a user to select objects, icons, text and the like that appear on the display device 503 via a command such as a click of a button or the like. The one or more user output devices 603 include all possible types of devices and mechanisms for outputting information from the computer 501. These may include a display (e.g., a monitor), printers, non-visual displays such as audio output devices, etc.

The communications interface 605 provides an interface to the communication network 610 and devices and may serve as an interface for receiving data from and transmitting data to other systems, the Internet and/or wireless area network 507. Embodiments of the communications interface 605 typically include an Ethernet card, a modem (telephone, satellite, cable, ISDN), a (asynchronous) digital subscriber line (DSL) unit, a FireWire® interface, a USB® interface, a wireless network adapter, and the like. For example, the communications interface 605 may be coupled to a computer network, to a FireWire® bus, or the like. In other embodiments, the communications interface 605 may be physically integrated on the motherboard of the computer 501, and/or may be a software program, or the like.

The RAM 607 and the non-volatile storage drive 608 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. The RAM 607 and the non-volatile storage drive 608 may be configured to store the basic programming and data constructs that provide the functionality of various embodiments of the present invention, as described above.

Software instruction sets that provide the functionality of the present invention may be stored in the RAM 607 and the non-volatile storage drive 608. These instruction sets or code may be executed by the one or more processors 606. The RAM 607 and the non-volatile storage drive 608 may also provide a repository for storing data and data structures used in accordance with the present invention. The RAM 607 and the non-volatile storage drive 608 may include a number of memories including a main random access memory (RAM) for storage of instructions and data during program execution and a read-only memory (ROM) in which fixed instructions are stored. The RAM 607 and the non-volatile storage drive 608 may include a file storage subsystem providing persistent (non-volatile) storage for program and/or data files. The RAM 607 and the non-volatile storage drive 608 may also include removable storage systems, such as removable flash memory.

The Bus subsystem 609 provides a mechanism for letting the various components and subsystems of the computer 501 communicate with each other as intended. Although the bus subsystem 609 is shown schematically as a single bus, alternative embodiments of the bus subsystem may utilize multiple busses or communication paths within the computer 501.

While the principles of the disclosure have been described above in connection with specific apparatuses and methods, it is to be clearly understood that this description is made only by way of example and not as limitation on the scope of the disclosure.

The invention claimed is:

1. A paleogeographic search system for locating oil exploration data relevant to a geographic search aperture by identifying regions of the earth that were proximal neighbors in the past, but are not necessarily proximal neighbors today, the paleogeographic search system comprising:
   a user interface adapted to receive inputted information into the paleogeographic search system, wherein the inputted information includes:
      geographic information defining the geographic search aperture, which comprises at least one of a spatial distance metric, a geographic coordinate, or a geometric shape, and
      a geological age of interest;
   a paleogeographic reconstruction engine, operative to transform the geographic search aperture, according to tectonic plate movements, to a transformed search aperture that the geographic search aperture occupied in the geological age of interest; and
   a host processor operative to:
      acquire a search from a geodatabase for oil exploration data according to a paleoaugmented geographic search aperture, wherein the acquiring search comprises hydrocarbon information from multiple geodatabases relevant to the transformed search aperture and wherein the paleoaugmented geographic search aperture is defined by:
         augmenting the transformed search aperture to include relevant proximal locations for the selected geological age of interest to create an augmented transformed search area; and
         transforming the augmented transformed search aperture, according to tectonic plate movements, to the paleoaugmented geographic search aperture in present day world geography using the paleogeographic reconstruction engine;
      generate a list of specific items of relevant natural resource data; and
      compare the items based upon search results from the multiple geodatabases.

2. The paleogeographic search system for locating oil exploration data relevant to a geographic search aperture by identifying regions of the earth that were proximal neighbors in the past, but are not necessarily proximal neighbors today of claim 1, wherein the transformed search aperture is expanded to conform to a geometric shape.

3. The paleogeographic search system for locating oil exploration data relevant to a geographic search aperture by identifying regions of the earth that were proximal neighbors in the past, but are not necessarily proximal neighbors today of claim 1 or 2, wherein the geological age of interest is at least five thousand years prior to the present day.

4. The paleogeographic search system for locating oil exploration data relevant to a geographic search aperture by identifying regions of the earth that were proximal neighbors in the past, but are not necessarily proximal neighbors today of any one of the previous claims, wherein results of the search from the geodatabase comprise a list of specific items of oil exploration data.

5. The paleogeographic search system for locating oil exploration data relevant to a geographic search aperture by identifying regions of the earth that were proximal neighbors in the past, but are not necessarily proximal neighbors today of any one of the previous claims, wherein results of the search are provided with geolocations overlaid on a map view.

6. A method for locating natural resource data relevant to a geographic search aperture by identifying regions of the earth that were proximal neighbors in the past, but are not necessarily proximal neighbors today, the method comprising:
   providing access, with a user interface, to a paleogeographic search system having a geodatabase containing natural resource data;
   receiving to the paleogeographic search system a geographic search aperture; receiving to the paleogeographic search system a geological age of interest;
   transforming, with a paleogeographic reconstruction engine, the geographic search aperture, according to tectonic plate movements, into a transformed search aperture that the geographic search aperture occupied in the geological age of interest; and
   acquiring a search of a geodatabase for natural resource data relevant to a paleoaugmented geographic search aperture, wherein the acquiring search comprises hydrocarbon information from multiple geodatabases relevant to the transformed search aperture and wherein the paleoaugmented geographic search aperture is defined by:
  augmenting the transformed search aperture to include relevant proximal locations for the selected geological age of interest to create an augmented transformed search area; and
  transforming the augmented transformed search aperture, according to tectonic plate movements, to the paleoaugmented geographic search aperture in present day world geography using the paleogeographic reconstruction engine;
generating a list of specific items of relevant natural resource data; and
comparing the items based upon search results from the plurality of geodatabases.

7. The method for locating natural resource data relevant to a geographic search aperture by identifying regions of the earth that were proximal neighbors in the past, but are not necessarily proximal neighbors today of claim 6, the method further comprising generating a list of specific items of natural resource data with the search.

8. The method for locating natural resource data relevant to a geographic search aperture by identifying regions of the earth that were proximal neighbors in the past, but are not necessarily proximal neighbors today of claim 6 or 7, wherein results of the search are geolocated on a map view.

9. The method for locating natural resource data relevant to a geographic search aperture by identifying regions of the earth that were proximal neighbors in the past, but are not necessarily proximal neighbors today of any one of claims 6 to 8, wherein results of the search are provided with a relevancy metric.

10. The method for locating natural resource data relevant to a geographic search aperture by identifying regions of the earth that were proximal neighbors in the past, but are not necessarily proximal neighbors today of any one of claims 6 to 9, wherein the transformed search aperture comprises non-contiguous regions.

11. The method for locating natural resource data relevant to a geographic search aperture by identifying regions of the earth that were proximal neighbors in the past, but are not necessarily proximal neighbors today of claim 10, wherein the transformed search aperture comprises regions separated by a plate boundary.

12. The method for locating natural resource data relevant to a geographic search aperture by identifying regions of the earth that were proximal neighbors in the past, but are not necessarily proximal neighbors today of any one of claims 6 to 11, wherein results of the search comprise data that are correlated based upon matches between specific layers of strata.

13. The method for locating natural resource data relevant to a geographic search aperture by identifying regions of the earth that were proximal neighbors in the past, but are not necessarily proximal neighbors today of any one of claims 6 to 12, wherein the transformed search aperture is transformed by disturbances resulting from at least one of: divergent plate boundaries, convergent plate boundaries, transform plate boundaries, basal drag, slab suction, slab pull, external forces, tidal friction of the moon, volcanic activity, hot spots in the earth, asteroid impact, or earthquake.

14. The method for locating natural resource data relevant to a geographic search aperture by identifying regions of the earth that were proximal neighbors in the past, but are not necessarily proximal neighbors today of any one of claims 6 to 13, wherein the natural resource data comprises data on ore, precious gems or stones, or fossils.

15. A method of gathering seismic data relevant to a geographic search aperture by identifying regions of the earth that were proximal neighbors in the past, but are not necessarily proximal neighbors today, the method comprising:
  storing a set of seismic survey results in a geodatabase;
  receiving the geographic search aperture and a geological age of interest;
  transforming the geographic search aperture, according to tectonic plate movements and the geological age of interest, into a transformed search aperture;
  querying the geodatabase for a subset of the set of seismic survey results relevant to a paleoaugmented geographic search aperture, wherein the paleoaugmented geographic search aperture is defined by:
    augmenting the transformed search aperture to include relevant proximal locations for the selected geological age of interest to create an augmented transformed search aperture; and
    transforming the augmented transformed search aperture, according to tectonic plate movements, to the paleoaugmented geographic search aperture in present day world geography; and
  returning the subset of seismic survey results;
  generating a list of specific items of relevant natural resource data; and
  comparing the items based upon search results from the plurality of geodatabases.

16. The method of gathering seismic data relevant to a geographic search aperture by identifying regions of the earth that were proximal neighbors in the past, but are not necessarily proximal neighbors today of claim 15, wherein the subset of the seismic survey results are geolocated on a map view.

17. The method of gathering seismic data relevant to a geographic search aperture by identifying regions of the earth that were proximal neighbors in the past, but are not necessarily proximal neighbors today of claim 15 or 16, wherein the subset of the seismic survey results are provided with a relevancy metric.

18. The method of gathering seismic data relevant to a geographic search aperture by identifying regions of the earth that were proximal neighbors in the past, but are not necessarily proximal neighbors today of any one of claims 15 to 17, wherein the set of seismic survey results are relevant for oil exploration.

19. The method of gathering seismic data relevant to a geographic search aperture by identifying regions of the earth that were proximal neighbors in the past, but are not necessarily proximal neighbors today of any one of claims 15 to 18, wherein the set of seismic survey results comprises data from natural seismic events.

* * * * *